UNITED STATES PATENT OFFICE.

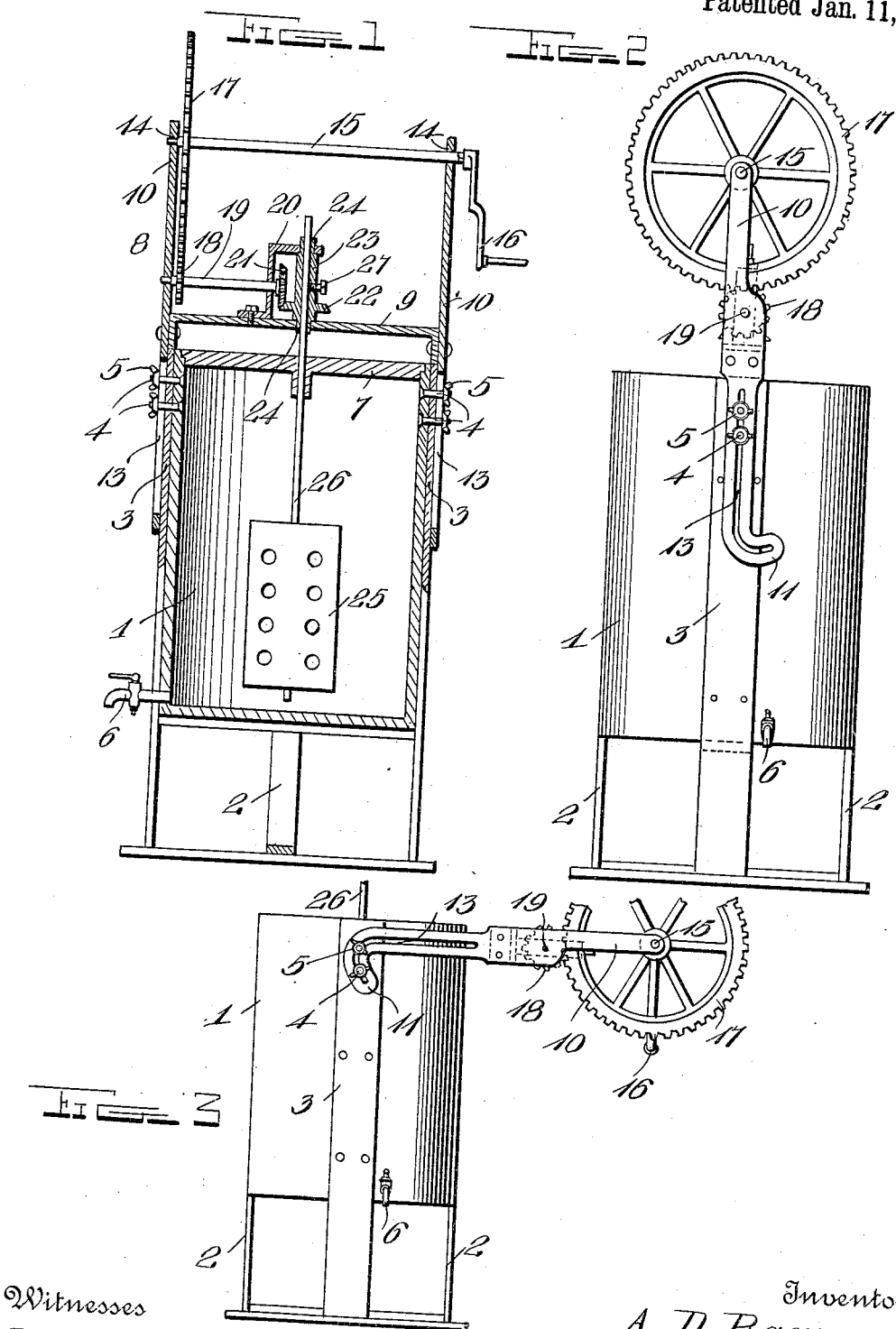

ALONZO DAVIS RAMSEY, OF DRYDEN, VIRGINIA.

CHURN.

946,398.

Specification of Letters Patent. Patented Jan. 11, 1910.

Application filed July 29, 1909. Serial No. 510,170.

*To all whom it may concern:*

Be it known that I, ALONZO D. RAMSEY, a citizen of the United States, residing at Dryden, State of Virginia, have invented certain new and useful Improvements in Churns; and I do declare the following to be a full, clear, and exact description of the invention, such as will enable others skilled in the art to which it appertains to make and use the same.

This invention relates to improvements in churns.

One object of the invention is to provide a churn having an improved construction of operating mechanism whereby the dasher will be rapidly driven thereby expediting the churning operation.

Another object is to provide a churn in which the dasher operating mechanism may be elevated and swung down along side the churn to an out of the way position, thereby permitting access to the churn for the purpose of working the butter therein.

With the foregoing and other objects in view, the invention consists of certain novel features of construction, combination and arrangement of parts, as will be more fully described and particularly pointed out in the appended claims.

In the accompanying drawings, Figure 1 is a central vertical sectional view of a churn constructed in accordance with the invention; Fig. 2 is a side view showing the operating mechanism in position to operate the dasher; Fig. 3 is a similar view, showing the operating mechanism swung down to an inoperative position to permit access to the churn.

Referring more particularly to the drawings, 1 denotes the churn body which is arranged in a suitable frame 2, having upwardly extending side bars 3 in which and in the adjacent sides of the churn, near the upper end thereof, are arranged laterally projecting guide bolts 4, on the outer ends of which screw winged clamping nuts 5. In the churn body 1, near the bottom thereof, is arranged a faucet 6, through which the butter-milk is drawn out of the churn. The upper end of the churn is preferably closed by a suitable cover 7.

Arranged on the upper end of the churn is the supporting frame 8 for the dasher operating mechanism, said frame comprising a cross bar 9, to the opposite ends of which are secured standards 10. The standards 10 project below the cross bar 9 and have on their lower ends laterally projecting offset portions 11. In the lower ends of the standards 10 and the offset portions 11, are formed slots 13. When the frame is in position on the upper end of the churn, the bolts 4 engage the slots 13 in the lower portions of the standards 10 and when the clamping nuts 5 are screwed up on said bolts, the frame will be securely clamped to the side bars 3 of the churn frame, thus holding the frame 8 in operative position above the churn body.

In the upper ends of the standards 10 are arranged bearings 14, in which is revolubly mounted a main operating shaft 15, on one end of which is arranged a crank handle 16. On the opposite end of the shaft 15 is fixedly mounted a driving gear 17 which is engaged with a pinion 18 on a counter shaft 19 mounted at one end in one of the standards 10 and at its opposite end in a right angular bearing bracket 20 is secured to the cross bar 9 of the frame 8. On the inner end of the shaft 19 is fixedly mounted a bevel gear pinion 21 which is engaged with a bevel gear pinion 22 formed on a sleeve 23. The sleeve 23 has formed on its opposite ends reduced journals 24 which are engaged with bearings in the cross bar 9 and in the bearing bracket 20, whereby said sleeve may be revolved by the driving gears connected therewith.

Arranged in the body of the churn, is a suitable dasher 25, the shaft 26 of which projects through the cover 7 and through the sleeve 23 and is rigidly secured to said sleeve by the set screw 27 arranged therein, as shown. By thus connecting the dasher shaft to the sleeve 23, said dasher will be rapidly revolved by the sleeve when the latter is driven through the gear pinions 18 and 21 and the large gear wheel 17 of the operating mechanism.

By providing the lower portions of the standards 10 with the slots 13 through which the bolts 4 extend, the frame 8 may be raised when the set screw 27 is loosened to release the sleeve 23 from the dasher rod and after being raised, may be swung downwardly to an inoperative position at one side of the churn, thus permitting access to the churn for the purpose of working the butter in the churn body. When the frame 8 is thus swung downwardly to an inoperative position, the bolts 4 will be engaged with the end of the slot in the offset portion 11 of the standards 10.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a churn, a frame, a churn body arranged in said frame, a dasher arranged in said churn body, a dasher shaft connected to said dasher and projecting above the churn body, a dasher operating mechanism comprising a supporting frame, a revolubly mounted sleeve, means to detachably secure said sleeve to the dasher shaft, a gear arranged on said sleeve, a main drive shaft revolubly mounted in said frame, means to drive said shaft, a main drive gear mounted on one end of said shaft, a counter shaft revolubly mounted on said frame, pinions on the opposite ends of said counter shaft, one of said pinions engaging the gear on said sleeve and the other pinion engaging said main drive gear, whereby said sleeve and dasher are operated, and means whereby the supporting frame for said operating mechanism is secured in operative and inoperative positions on the churn.

2. In a churn, a dasher operating mechanism, a supporting frame for said mechanism, said frame comprising a cross bar arranged over the churn, standards secured to the opposite end of said bar, said standards having downwardly projecting offset lower ends in which are formed offset slots, frame holding bolts arranged on the churn and projecting through said slots whereby said frame may be raised and swung downwardly to an inoperative position, and clamping nuts on said bolts adapted to hold said frame in an operative position over the churn.

In testimony whereof I have hereunto set my hand in presence of two subscribing witnesses.

ALONZO DAVIS RAMSEY.

Witnesses:
R. McMILLAN,
T. E. CLEMENT.